(12) United States Patent
Lin

(10) Patent No.: US 8,229,514 B2
(45) Date of Patent: Jul. 24, 2012

(54) DECT WIRELESS HANDS-FREE COMMUNICATION APPARATUS

(75) Inventor: Pi-Fen Lin, Keelung (TW)

(73) Assignee: Sure Best Limited, Apia (WS)

( * ) Notice: Subject to any disclaimer, the term of this patent is extended or adjusted under 35 U.S.C. 154(b) by 259 days.

(21) Appl. No.: 12/722,198

(22) Filed: Mar. 11, 2010

(65) Prior Publication Data

US 2011/0039604 A1 Feb. 17, 2011

(30) Foreign Application Priority Data

Aug. 12, 2009 (TW) .............................. 98127162 A

(51) Int. Cl.
H04M 1/10 (2006.01)

(52) U.S. Cl. ................. 455/569.1; 455/575.2; 455/41.2; 455/557; 345/173; 381/375

(58) Field of Classification Search .................. 455/569, 455/41.2, 569.1, 556.1, 425, 556.2, 3.06, 455/403, 352, 151.4, 152.1, 420, 557, 418, 455/426, 414, 556, 436, 550.1, 575.2; 379/420.04, 379/430, 455, 443; 370/352, 338; 206/320, 206/702, 472; 381/334, 59, 375; 341/22, 341/26; 320/103, 128, 134; 345/8, 173; 429/97, 90; 375/140; 174/268
See application file for complete search history.

(56) References Cited

U.S. PATENT DOCUMENTS

| | | | | |
|---|---|---|---|---|
| 4,323,734 A * | 4/1982 | Kimzey | .......................... | 379/162 |
| 5,491,507 A * | 2/1996 | Umezawa et al. | .......... | 348/14.02 |
| 6,052,070 A * | 4/2000 | Kivela et al. | .................... | 341/22 |
| 6,161,005 A * | 12/2000 | Pinzon | .......................... | 455/403 |
| 6,223,029 B1 * | 4/2001 | Stenman et al. | .............. | 455/420 |
| 6,243,578 B1 * | 6/2001 | Koike | ............................. | 455/557 |
| 7,099,468 B1 * | 8/2006 | Shuniak et al. | ................ | 379/455 |
| 8,047,365 B1 * | 11/2011 | Lin et al. | ........................ | 206/320 |
| 2001/0004397 A1 * | 6/2001 | Kita et al. | ...................... | 381/334 |
| 2005/0027385 A1 * | 2/2005 | Yueh | ............................... | 700/94 |
| 2005/0078844 A1 * | 4/2005 | Von Ilberg | ..................... | 381/322 |
| 2005/0181826 A1 * | 8/2005 | Yueh | ............................ | 455/556.2 |
| 2005/0280398 A1 * | 12/2005 | Lee et al. | ........................ | 320/134 |
| 2007/0123296 A1 * | 5/2007 | Chen | ........................... | 455/550.1 |
| 2007/0141985 A1 * | 6/2007 | Parkkinen et al. | ............ | 455/41.2 |
| 2007/0155313 A1 * | 7/2007 | Goldberg et al. | ............. | 455/3.06 |
| 2007/0280189 A1 * | 12/2007 | Han et al. | ....................... | 370/338 |
| 2008/0013601 A1 * | 1/2008 | Lind et al. | ...................... | 375/140 |
| 2008/0139186 A1 * | 6/2008 | Ringland et al. | .............. | 455/415 |
| 2008/0303681 A1 * | 12/2008 | Herz et al. | ..................... | 340/671 |
| 2009/0010246 A1 * | 1/2009 | Grattan et al. | ................. | 370/352 |
| 2009/0016245 A1 * | 1/2009 | Karls | ............................. | 370/310 |
| 2009/0236140 A1 * | 9/2009 | Randall | ......................... | 174/268 |
| 2010/0026609 A1 * | 2/2010 | Otsuki et al. | ...................... | 345/8 |

(Continued)

*Primary Examiner* — Tan Trinh

(74) *Attorney, Agent, or Firm* — Muncy, Geissler, Olds & Lowe, PLLC

(57) ABSTRACT

The present invention provides a DECT (Digital Enhanced Cordless Telecommunication) wireless hands-free communication apparatus which includes a DECT host and a DECT earphone, wherein the DECT host is coupled with the Public Switch Telephone Network (PSTN) and configures an earphone receiving recess, which configures with a magnetic device mounted on the DECT host. The DECT earphone wirelessly communicates with the DECT host via the digital enhanced cordless telecommunication technique and the DECT earphone is detachable while it is attached to the earphone receiving recess The DECT earphone configures a magnetic conductive device, wherein the magnetic conductive device magnetically attracts to the magnetic device while the DECT earphone is close to the earphone receiving recess, whereby the DECT earphone electrically connects with the DECT host.

10 Claims, 16 Drawing Sheets

U.S. PATENT DOCUMENTS

| | | | | |
|---|---|---|---|---|
| 2010/0046767 A1* | 2/2010 | Bayley et al. | | 381/59 |
| 2010/0291928 A1* | 11/2010 | Valdez | | 455/436 |
| 2011/0019860 A1* | 1/2011 | Birch et al. | | 381/375 |
| 2011/0275323 A1* | 11/2011 | Goldman et al. | | 455/41.2 |
| 2011/0294423 A1* | 12/2011 | Lin | | 455/41.2 |
| 2011/0295397 A1* | 12/2011 | Goldberg | | 700/94 |
| 2011/0306393 A1* | 12/2011 | Goldman et al. | | 455/575.2 |

\* cited by examiner

DECT WIRELESS HANDS-FREE COMMUNICATION APPARATUS

BACKGROUND OF THE INVENTION

1. Field of the Invention

The present invention relates to a digital enhanced cordless telecommunication (DECT) wireless hands-free communication apparatus. In particular, the communication apparatus combines with public switch telephone network (PSTN) so as to provide users to dial a local call in accordance with the DECT wireless hands-free communication apparatus.

2. Description of Related Art

Referring to FIG. 1, which shows a schematic diagram of the telephone set in accordance with certain aspects of the prior art. The telephone set 1 includes a dialing host 10 and a transmitter 12. There is a communication connecting wire 14 between the dialing host 10 and the transmitter 12. It connects to the PSTN 2 through a transmitting wire 16. The user could dial a call by pressing the button 18 on the dialing host 10, communicate with a remote user via the PSTN 2 and talk to the remote user via the transmitter 12.

Recently, because the standard of the DECT becomes more popular and be prevalent globally. The advantages associated with the standard of the DECT communication are as following: First, the digital processing tone quality is high; second, the range of the transmission distance is large; and third, the communication reception is not easy to be disturbed in high communication density application.

Because the development of DECT wireless communication technology, the traditional technique of the dialing host 10 connecting with the transmitter 12 via the communication connecting wire 14 has been improved to become a wireless dialing transmitter 1' and a base station 10' with DECT wireless communicating function as shown in FIG. 2. The wireless dialing transmitter 1' communicates wirelessly to the base station 10' and the base station 10' connects with PSTN 2 so as to allow users to communicate with each other without any restrictions in distance.

However, when users need to communicates via the wireless dialing transmitter 1' for a long time, it is inconvenient for users to hold the wireless dialing transmitter P. Consequently, holding the wireless dialing transmitter 1' up too long may cause users to be uncomfortable associated with an arm ache and then the communication quality is reduced.

SUMMARY OF THE INVENTION

In view of the aforementioned issues, the present invention provides a method for increasing stability of a micro controller (MCU) system, which, through the error detecting device provided by the system, detects various error conditions and then sends signals to notify a error processing device for proper handling according to the error conditions detected, and thereby reducing the chance of occurrences of system erroneous actions due to error conditions, and further increasing the stability of the MCU system.

To achieve the above-mentioned objectives, the present invention provides a DECT wireless hands-free communication apparatus which includes a DECT host and a DECT earphone. Therein the DECT host is coupled with a PSTN and has an earphone receiving recess which configures a magnetic device. The DECT earphone wirelessly communicates with the DECT host via the digital enhanced cordless telecommunication technique and the DECT earphone is detachable while it is attached to the earphone receiving recess. The DECT earphone configures a magnetic conductive device, wherein the magnetic conductive device magnetically attracts to the magnetic device while the DECT earphone is close to the earphone receiving recess, whereby the DECT earphone is attached to the earphone receiving recess rapidly and electrically connects with the DECT host.

To achieve the above-mentioned objectives, the present invention further provides users the DECT wireless hands-free communication apparatus associated with the improvements and modifications in structure and circuitry connection for communication so as to prevent the user's arm from aching while users use the traditional telephone to make or receive a call for a long time.

In order to further understand the techniques, means and effects the present invention takes for achieving the prescribed objectives, the following detailed descriptions and appended drawings are hereby referred, such that, through which, the purposes, features and aspects of the present invention can be thoroughly and concretely appreciated; however, the appended drawings are merely provided for reference and illustration, without any intention to be used for limiting the present invention.

BRIEF DESCRIPTION OF THE DRAWINGS

FIG. 6B-1 to 6B-2 are circuitry diagrams of the DECT host in accordance with certain aspects of the present technique;

DETAILED DESCRIPTION OF THE PREFERRED EMBODIMENTS

Referring now to the accompanying drawings, the preferred embodiments of the present invention will be explained in detail.

Figure 1:
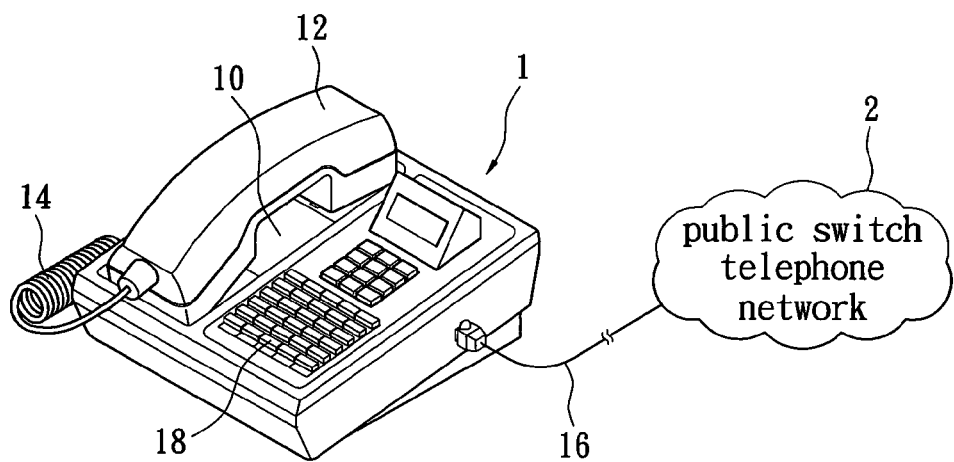
FIG. 1 is a schematic diagram of the telephone set in accordance with certain aspects of the prior art.
Figure 2:
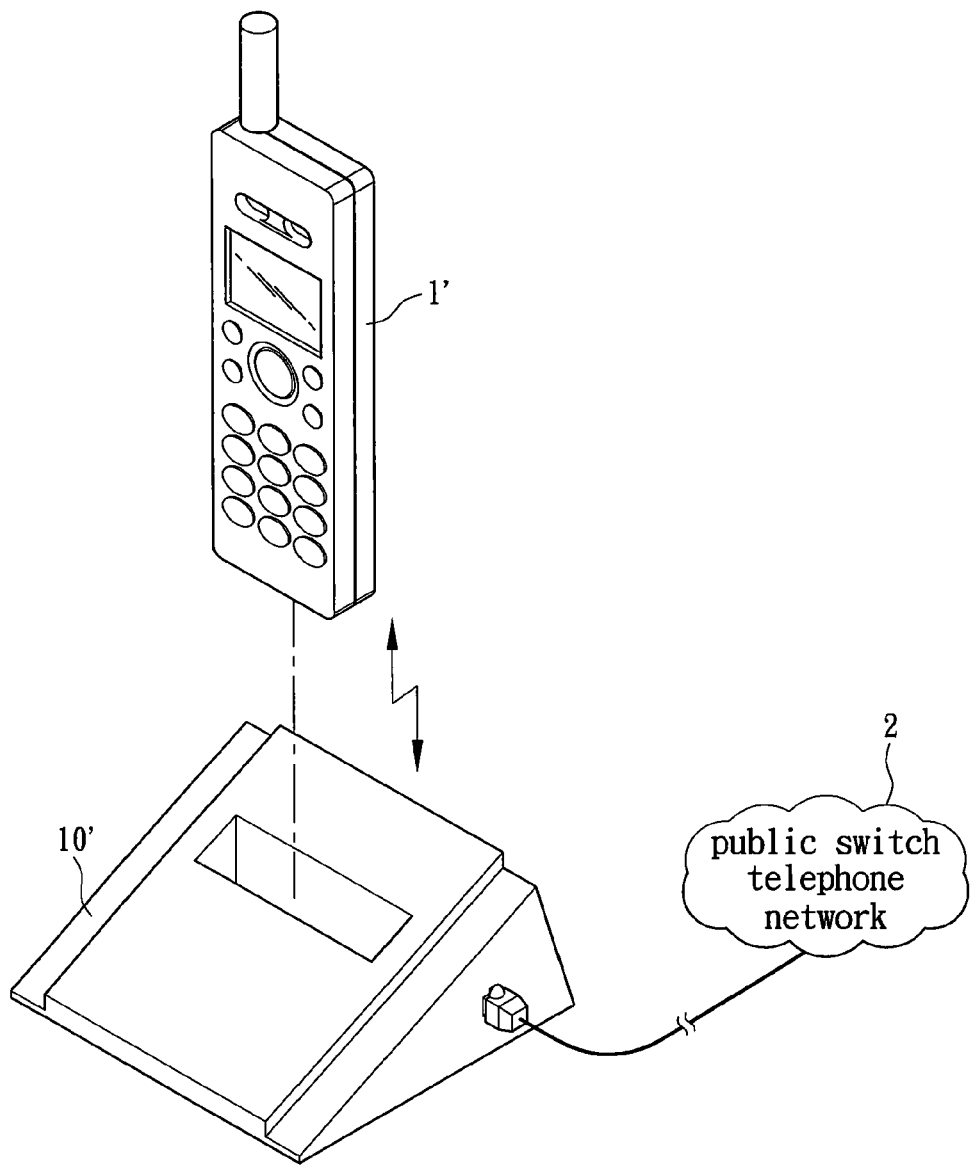
FIG. 2 is a schematic diagram of the wireless telephone set in accordance with certain aspects of the prior art.
Figure 3A:
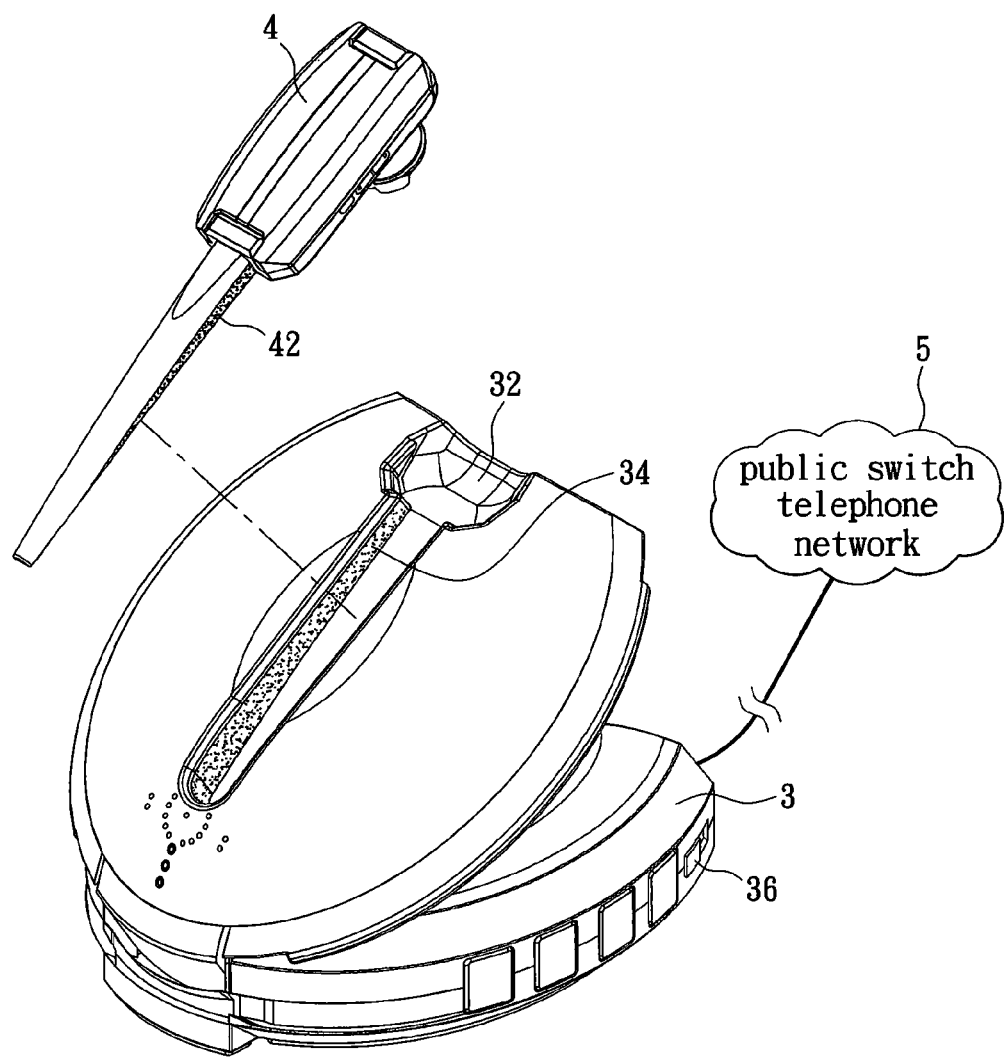
FIG. 3A is a diagrammatic perspective view of an embodiment of the DECT wireless hands-free communication apparatus.

First refer to FIG. 3A, in which a diagrammatic perspective view of an embodiment of the DECT wireless hands-free communication apparatus in accordance with certain aspects of the present technique is shown. The appearance of the wireless hands free communication apparatus is designed as a U word. Refer to the FIG. 3B, in which a diagrammatic perspective view of another embodiment of the DECT wireless hands free communication apparatus in accordance with certain aspects of the present technique is shown. The appearance of the wireless hands free communication apparatus is designed as rectangularity. In these embodiments, the DECT wireless hands-free communication apparatus includes a DECT host 3 and a DECT earphone 4. The DECT host 3 is coupled with a PSTN 5 and has an earphone receiving recess 32, wherein the earphone receiving recess 32 configures a magnetic device 34. The DECT earphone 4 wirelessly communicates with the DECT host 3 via the DECT wireless communication technique and is detachable while it is attached to the earphone receiving recess.

Reference is made to FIG. 3A or FIG. 3B again. The DECT earphone 4 configures a magnetic conductive device 42, wherein the magnetic conductive device 42 magnetically attracts to the magnetic device 34 while the DECT earphone 4 is close to the earphone receiving recess 32 whereby the DECT earphone 4 is attached on the earphone receiving recess 32 and electrically connects with the DECT host 3. The magnetic conductive device 42 is a metal device or a unit which could be magnetically attracted by the magnetic device 34. The design of the magnetic attraction effect associated with the magnetic device 34 is utilized to allow the magnetic device 34 mounted on the earphone receiving recess 32 to be attracted magnetically and attached together with the DECT earphone 4 rapidly while the DECT earphone 4 is moving closer to the earphone receiving recess 32, and thereby the DECT earphone 4 can be connected electronically with the DECT host 3.

Reference is made to FIG. 3A or FIG. 3B again. The DECT host 3 configures a first control circuit (not shown) internally, which is configured to provide a local call service. Mechanically, the earphone receiving recess 32 is mounted on the DECT host 3. The DECT earphone 4 configures a second control circuit (not shown). Therefore, the first control circuit is connected electronically to the second control circuit while the DECT earphone 4 is attached on the earphone receiving recess 32.

Reference is made to the FIG. 3A or FIG. 3B again. The DECT host 3 connects wired to the PSTN 5 and communicates remotely through the PSTN 5. The DECT host 3 has a function of audio amplifying and receiving for users to mutually communicate with each other. Besides, users can take out the DECT earphone 4 from the DECT host 3 to make a private call in hands-free way to communicate with any remote users. According to the aforementioned technique, the DECT earphone 4 wirelessly communicates with the DECT host 3 by the DECT technique when the DECT earphone 4 is departed from the DECT host 3.

Reference is made to the FIG. 3A or FIG. 3B again. When the DECT earphone 4 is attached to the DECT host, the DECT earphone 4 is electronically connected with the DECT host 3 through a USB or metal contacts. In addition, the DECT host 3 configures a lock machine 36, wherein the lock machine 36 is provided for users to have options to choose to lock the DECT earphone 4 in the earphone receiving recess 32 for preventing children taking out the DECT earphone 4 from the earphone receiving recess 32 or swallowing the DECT earphone 4 by accident.

Figure 4:
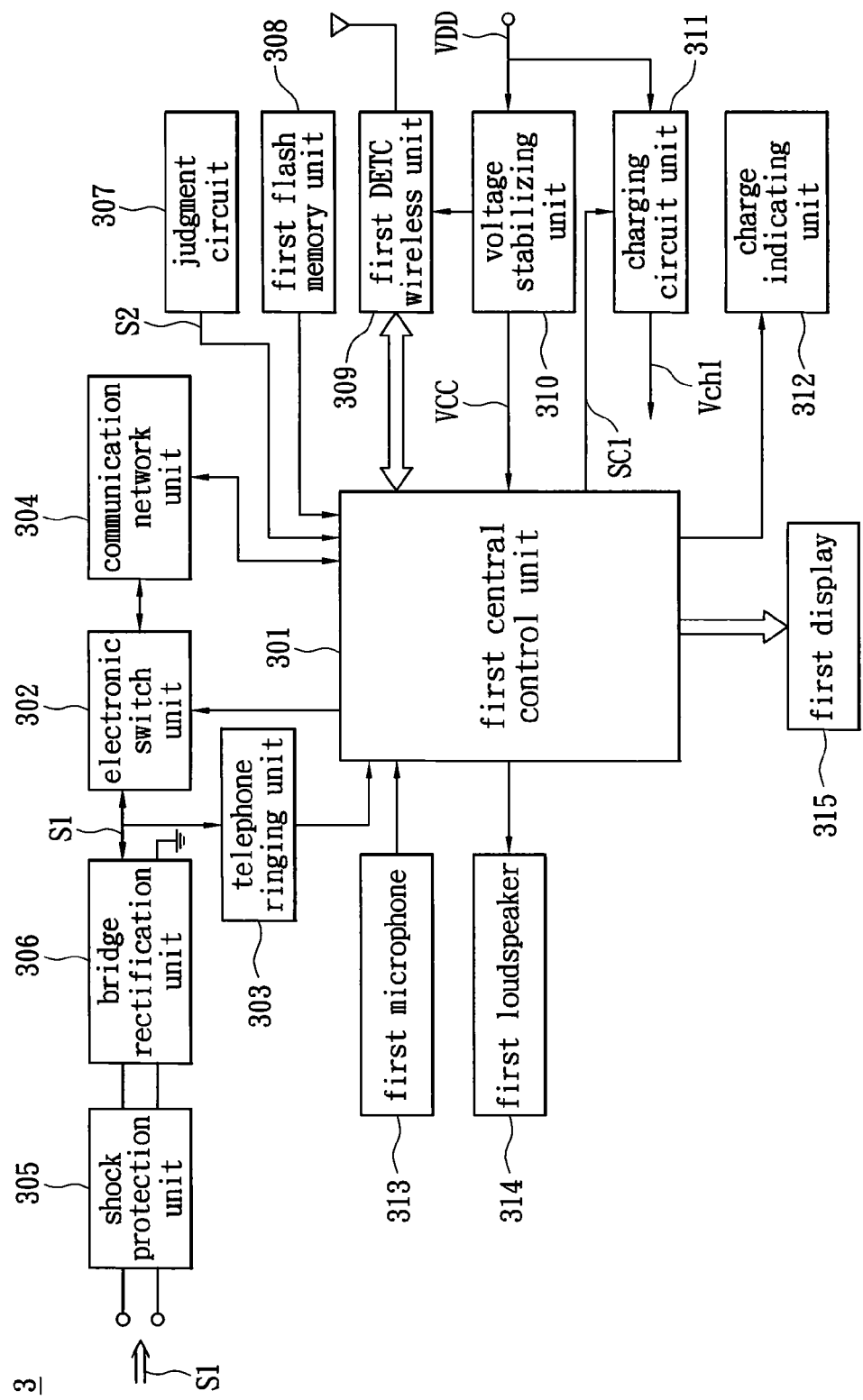
FIG. 4 is a functional block diagram in circuitry of the DECT host in accordance with certain aspects of the present technique.

Reference is made to the FIG. 4, which shows a circuitry block diagram of the DECT host in accordance with the certain aspects of the present technique. Reference are made to the FIG. 6A to 6D, these are circuitry diagrams of the DECT host in accordance with certain aspects of the present technique. The first control circuit includes a telephone ringing unit 303, an electronic switch unit 302, a first central control unit 301, a communication network unit 304, and a first DECT wireless unit 309. Herein the telephone ringing unit 303 receives an incoming call signal S1 from the PSTN 5 and generates a warning ringing according to the incoming call signal S1. The electronic switch unit 302 is coupled with the PSTN 5, the first central control unit 301 and the communication network unit 304.

The first central control unit 301 controls the electronic switch unit 302 to be turned on according to the incoming call signal S1 received through the telephone ringing unit 303. Meanwhile, the communication network unit 304 receives the incoming call signal S1 via the electronic switch unit 302 in conduction state and thereby providing the mutual communication network according to the incoming call signal S1. The first central control unit 301 executes the data processing for the mutual communication and transfers the outputting data to the DECT earphone 4 via the first DECT wireless unit 309 to achieve the goal for mutual-communicating wirelessly.

Figure 3B:
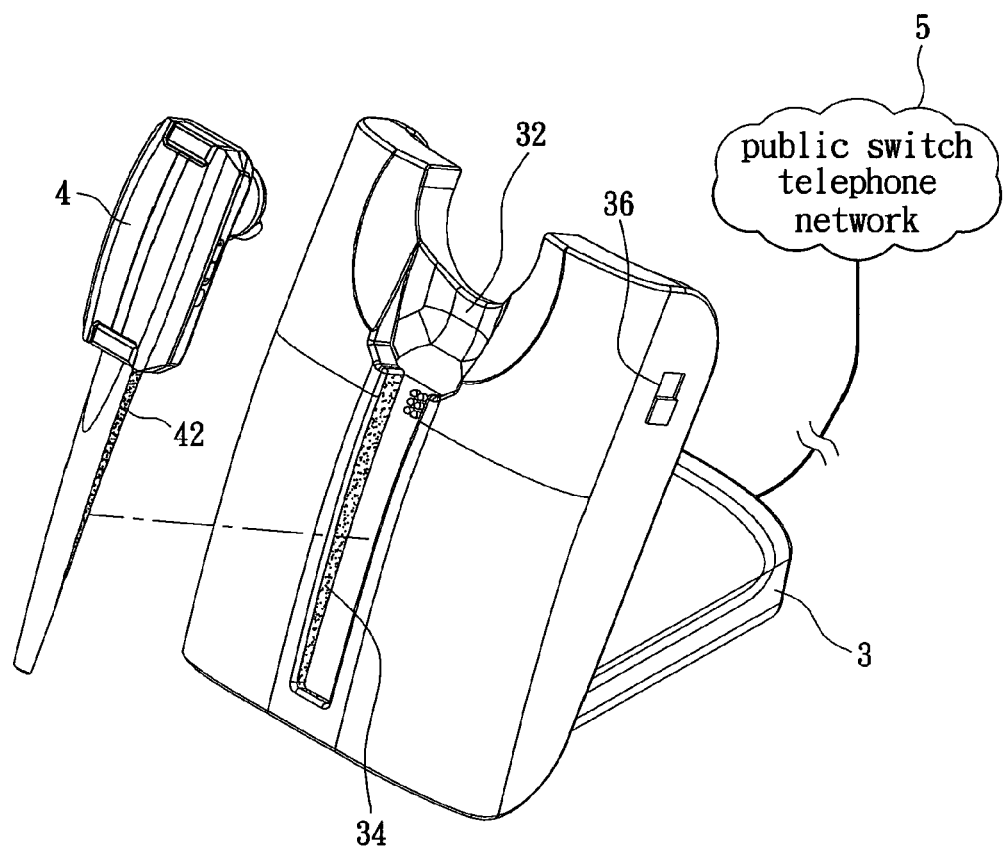
FIG. 3B is a diagrammatic perspective view of another embodiment of the DECT wireless hands-free communication apparatus.

In conjunction with the FIG. 3A or FIG. 3B, refer to the FIG. 4 again. The first control circuit of the DECT host 3 further includes a judgment circuit 307, a first display 315, a first flash memory unit 308, a first loudspeaker 314, a first microphone 313, a voltage stabilizing unit 310, a charging circuit unit 311 and a charge indicating unit 312. Herein all of them are coupled with the first central control unit 301. The judgment circuit 307 outputs a judgment signal S2 to the first central control unit 301 according to whether the earphone receiving recess 32 contains the DECT earphone 4. The first display 315 displays the information of a battery capacity, a dialing number, a contact phone book, and a charge state of the battery. The first flash memory unit 308 is configured to store a host application program executed by the first central control unit 301 for controlling the abovementioned units 307, 310, 311, 313, 314 and 315. The first loudspeaker 314 and the first microphone 313 are configured to broadcast and receive the audio respectively.

Besides, the voltage stabilizing unit 310 is coupled with the first DECT wireless unit 309 and is configured to receive a DC power VDD and output a supply voltage VCC to the first central control unit 301 and the first DECT wireless unit 309. The charging circuit unit 311 is configured to receive the DC power VDD and output a charging voltage Vch1 to the DECT earphone 4 while the DECT earphone 4 is attached on the earphone receiving recess 32 and the first central control unit 301 outputs a control signal SC1. The charging circuit unit 311 outputs the charging voltage Vch1 to the DECT earphone 4 according to the control signal SC1. The charge indicating unit 312 is configured to indicate the charge state of the battery.

In conjunction with the FIG. 3A or FIG. 3B, refer to the FIG. 4 again. The first control circuit of the DECT host 3 further comprises a shock protection unit 305 and a bridge rectification unit 306, wherein the shock protection unit 305 is coupled with the PSTN 5 and configured to protect the incoming call signal S1, and the bridge rectification unit 306 is coupled with the shock protection unit 305 and the telephone ringing unit 303 and configured to rectify the incoming call signal S1.

Figure 5:
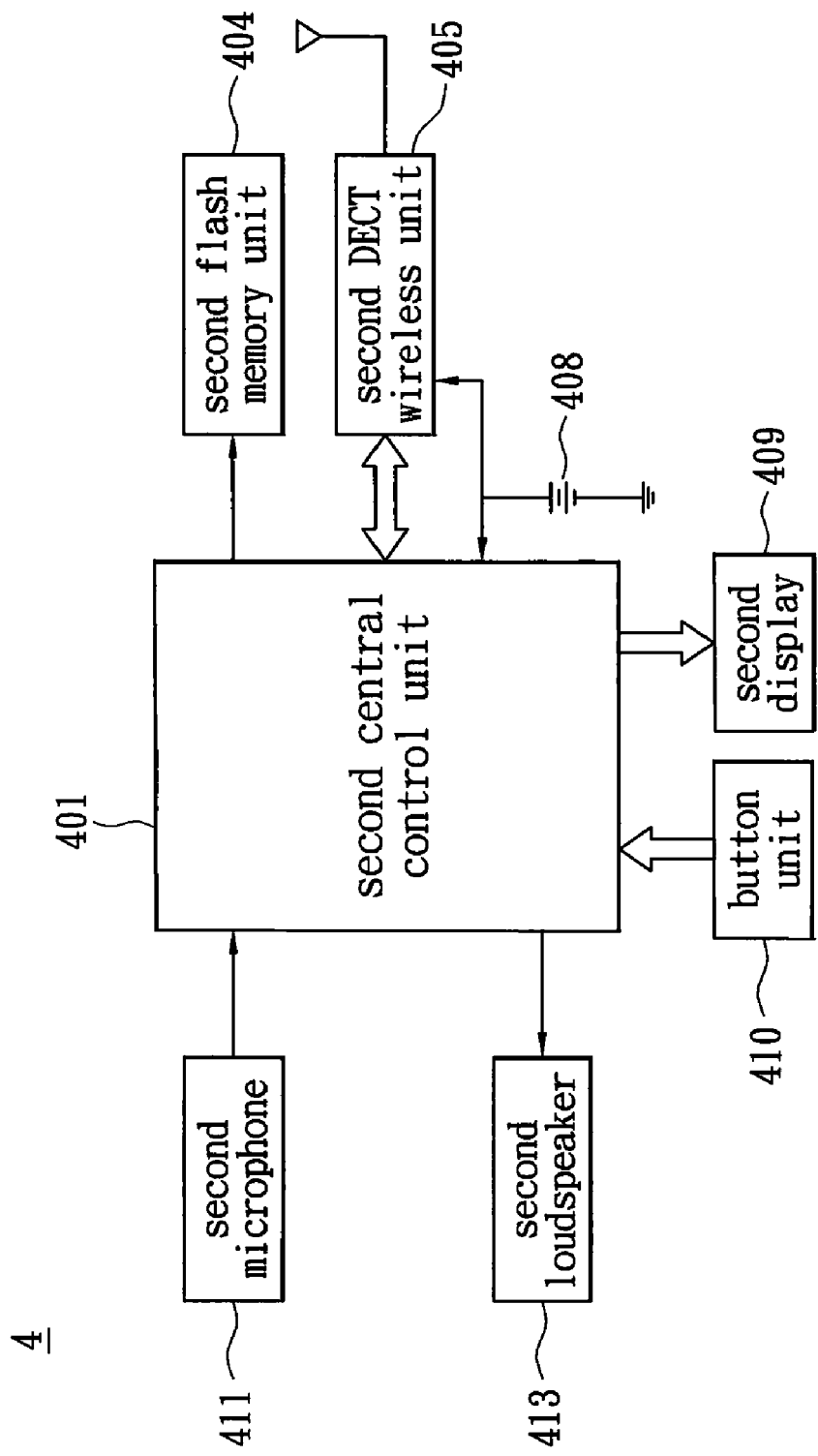
FIG. 5 is a functional block diagram of an embodiment of the DECT earphone in accordance with certain aspects of the present technique.
Figure 6A:
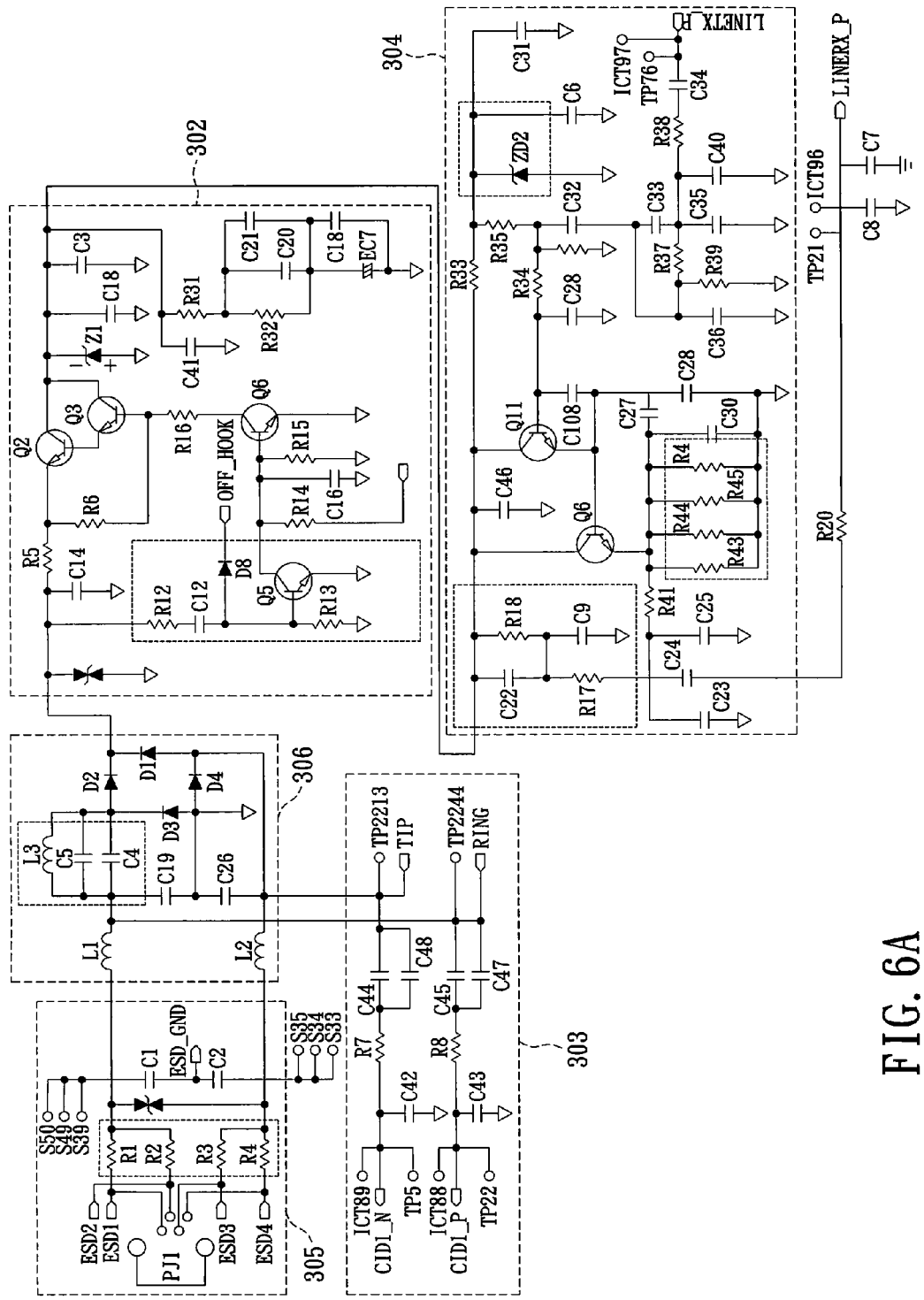
FIG. 6A is a circuitry diagram of the DECT host in accordance with certain aspects of the present technique.
Figures 1, 6B:
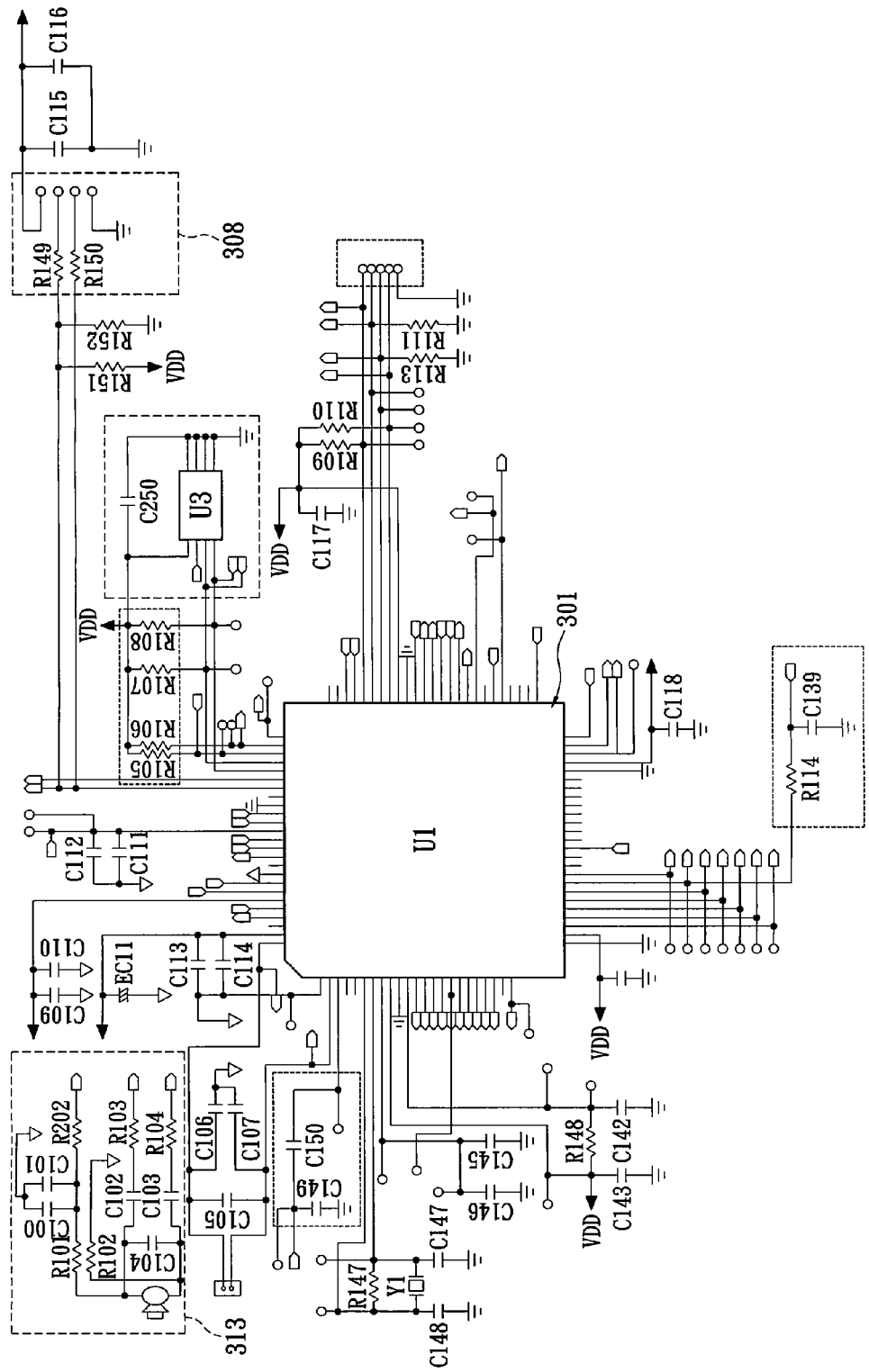
Figures 2, 6B:
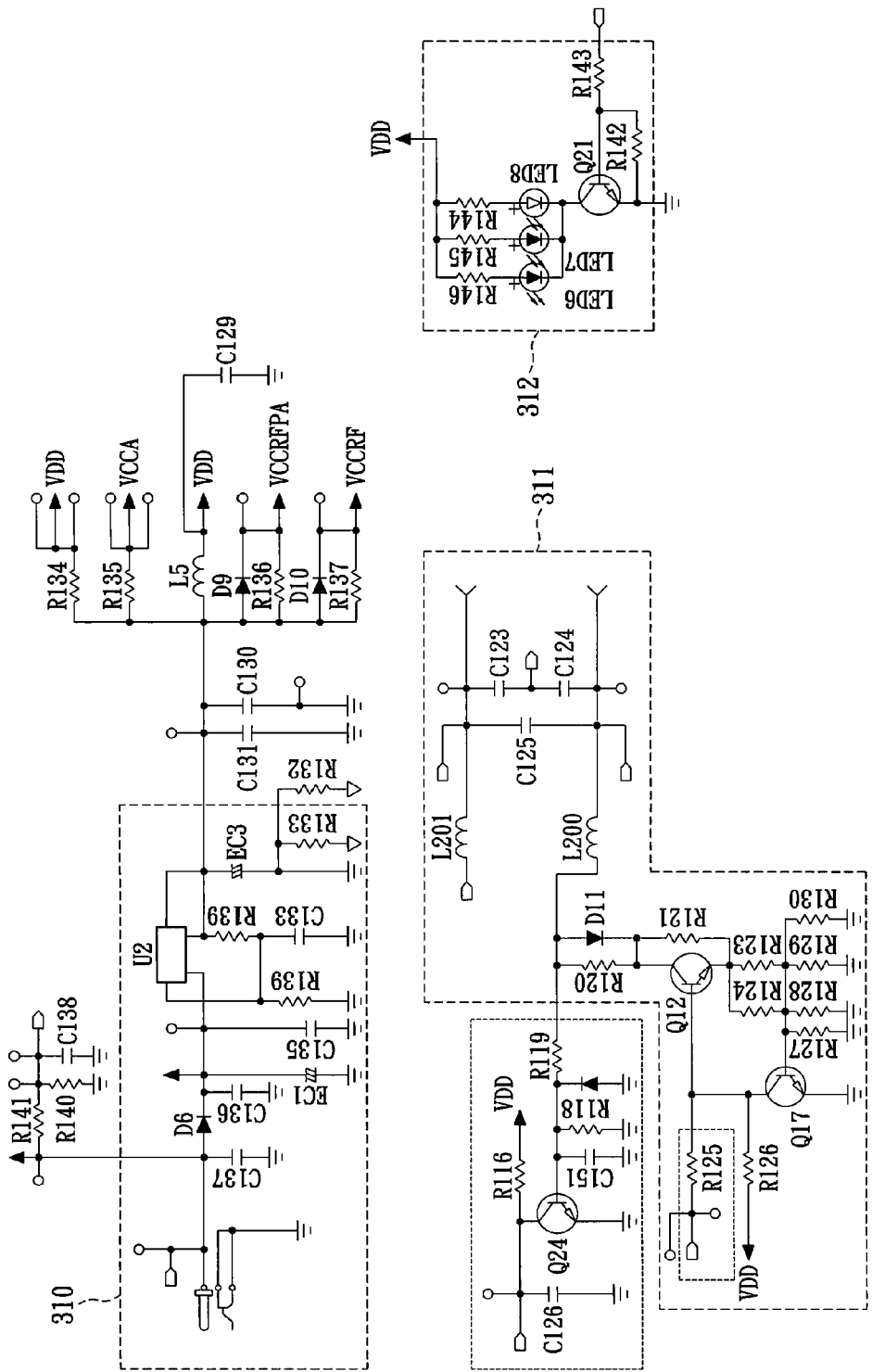
Figure 6C:
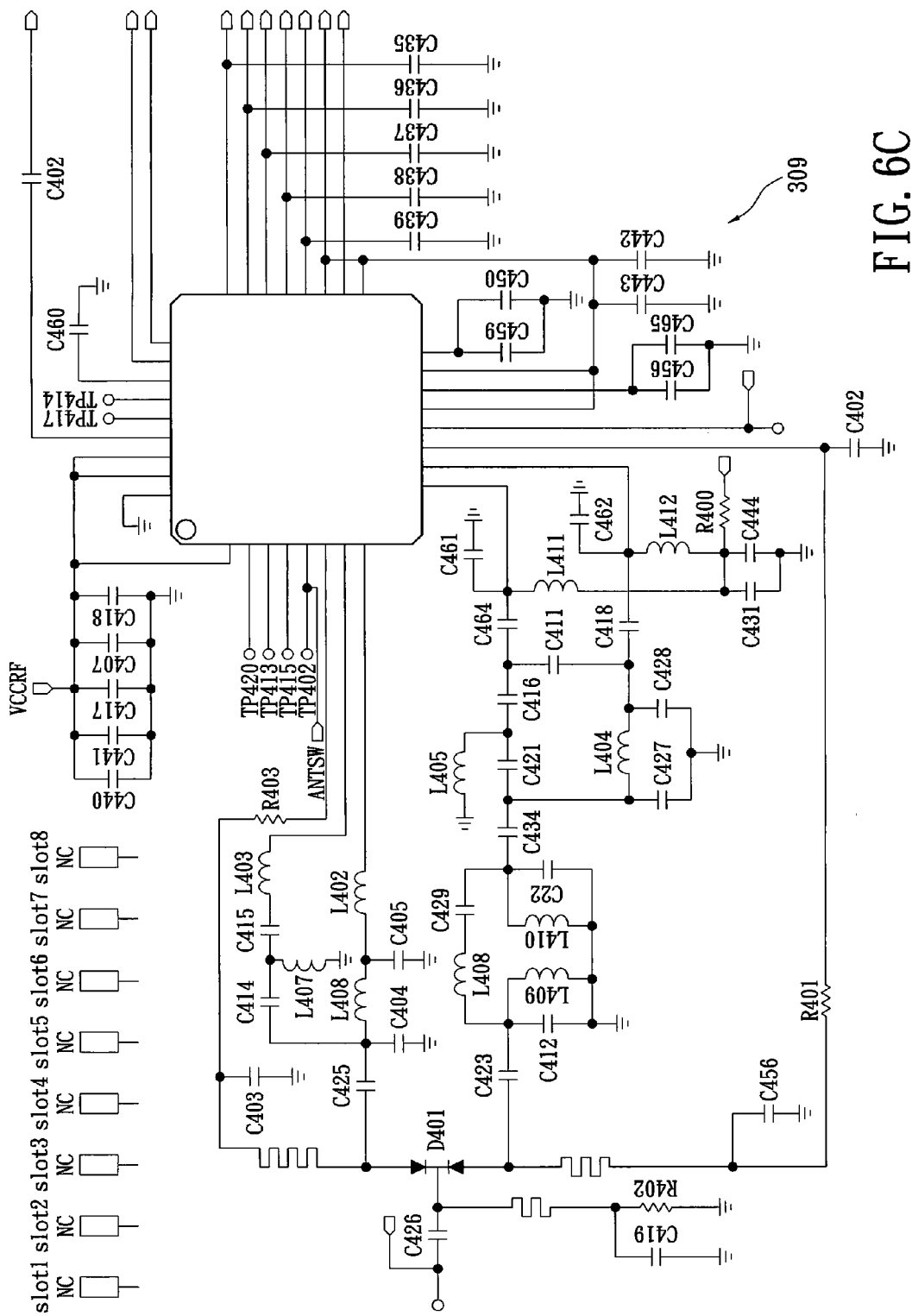
FIG. 6C to 6D are circuitry diagrams of the DECT host in accordance with certain aspects of the present technique.
Figure 6D:
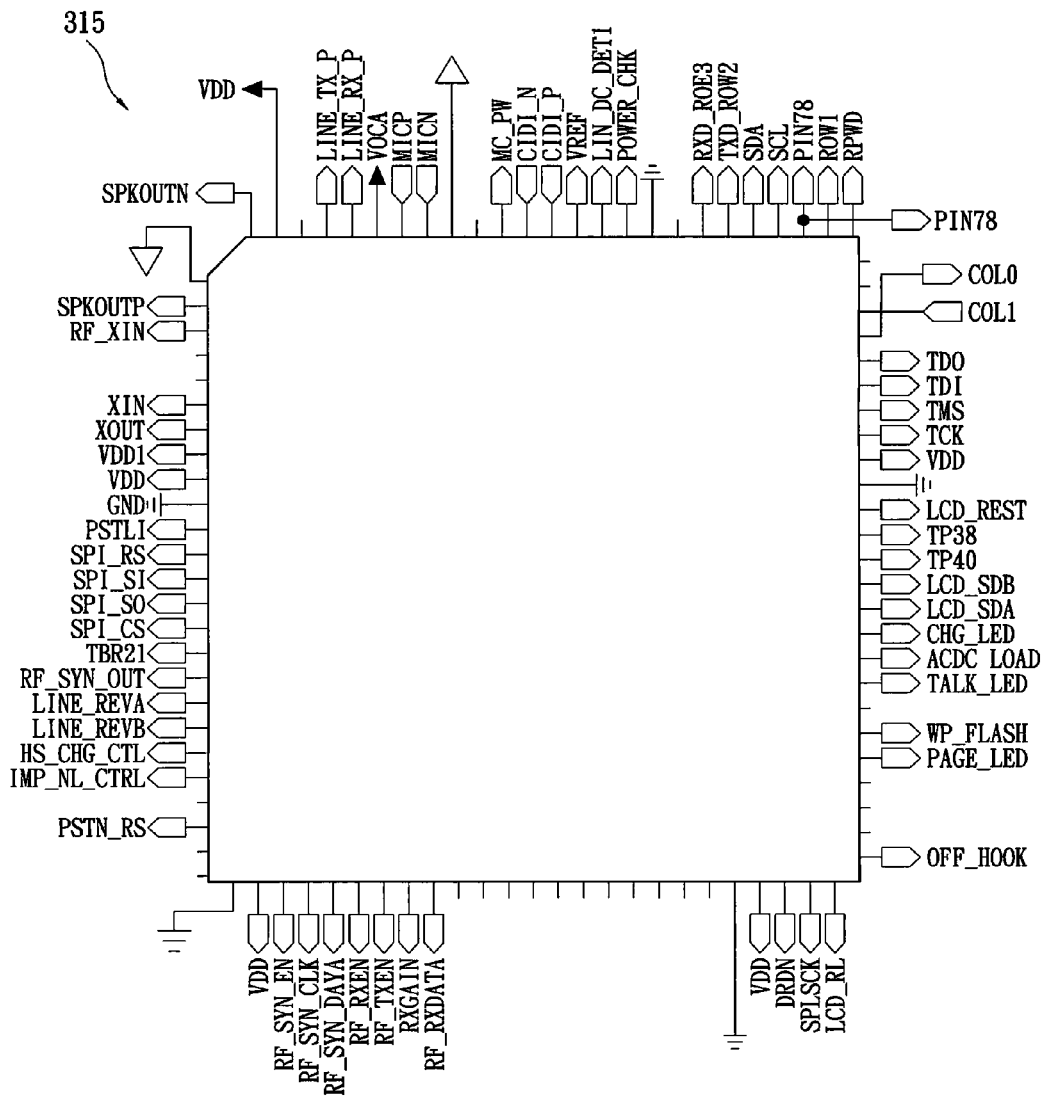
Figure 7A:
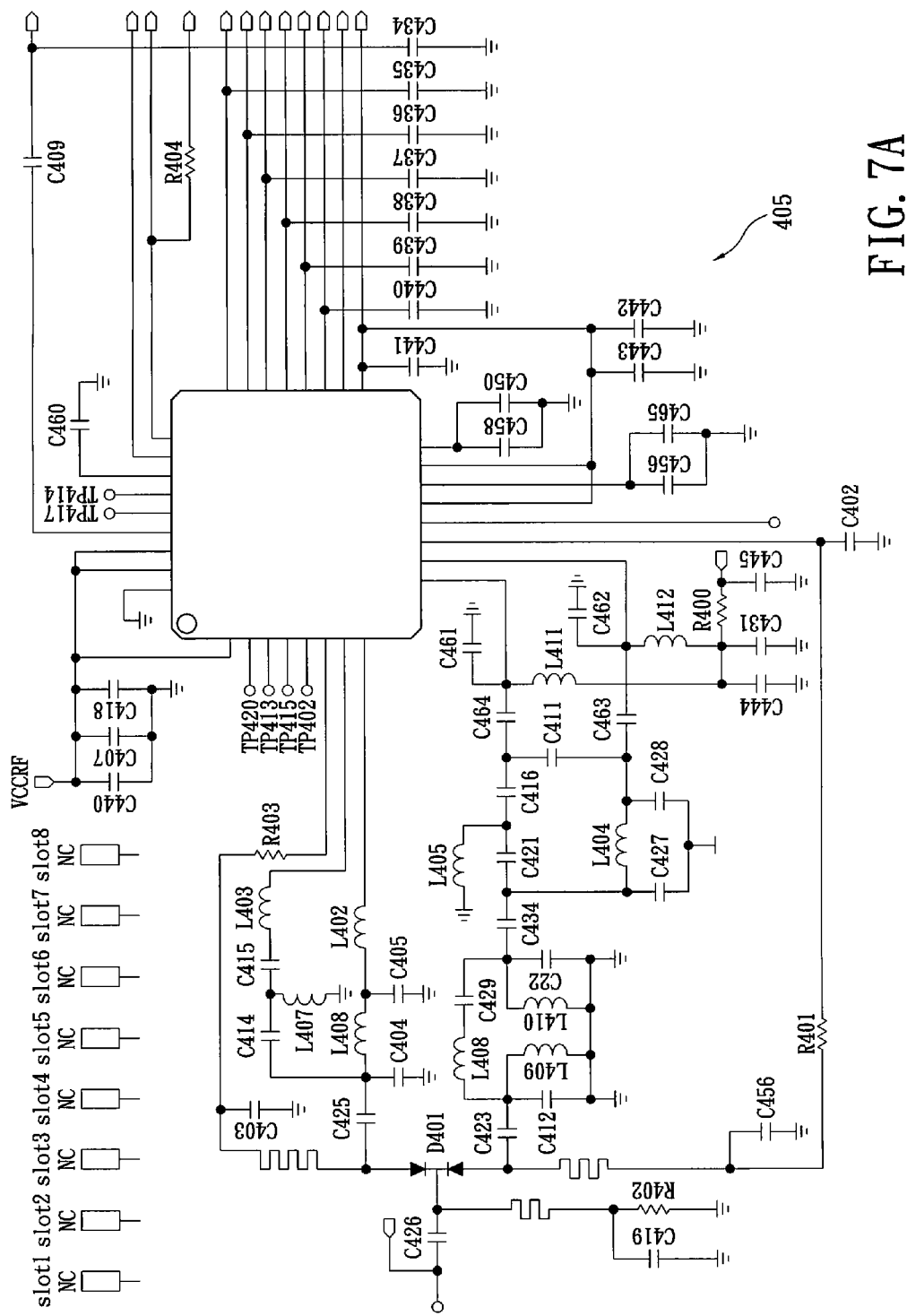
FIG. 7A to 7E are circuitry diagrams of the DECT earphone in accordance with certain aspects of the present technique.
Figure 7B:
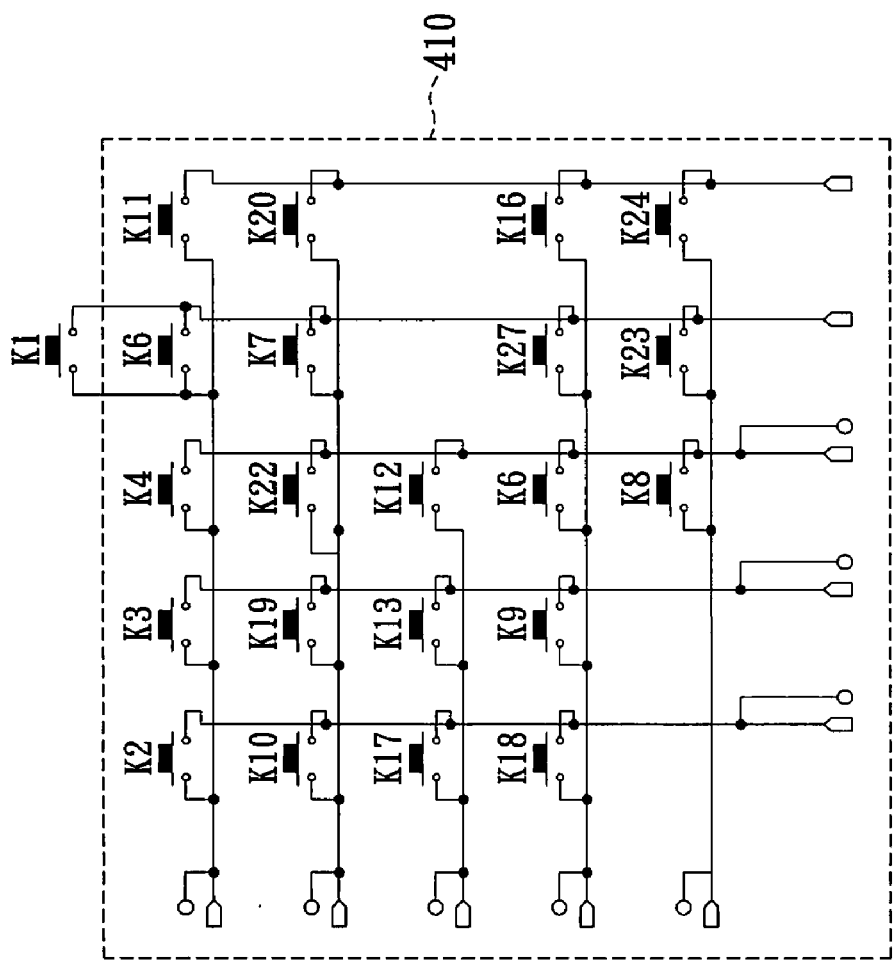
Figure 7C:
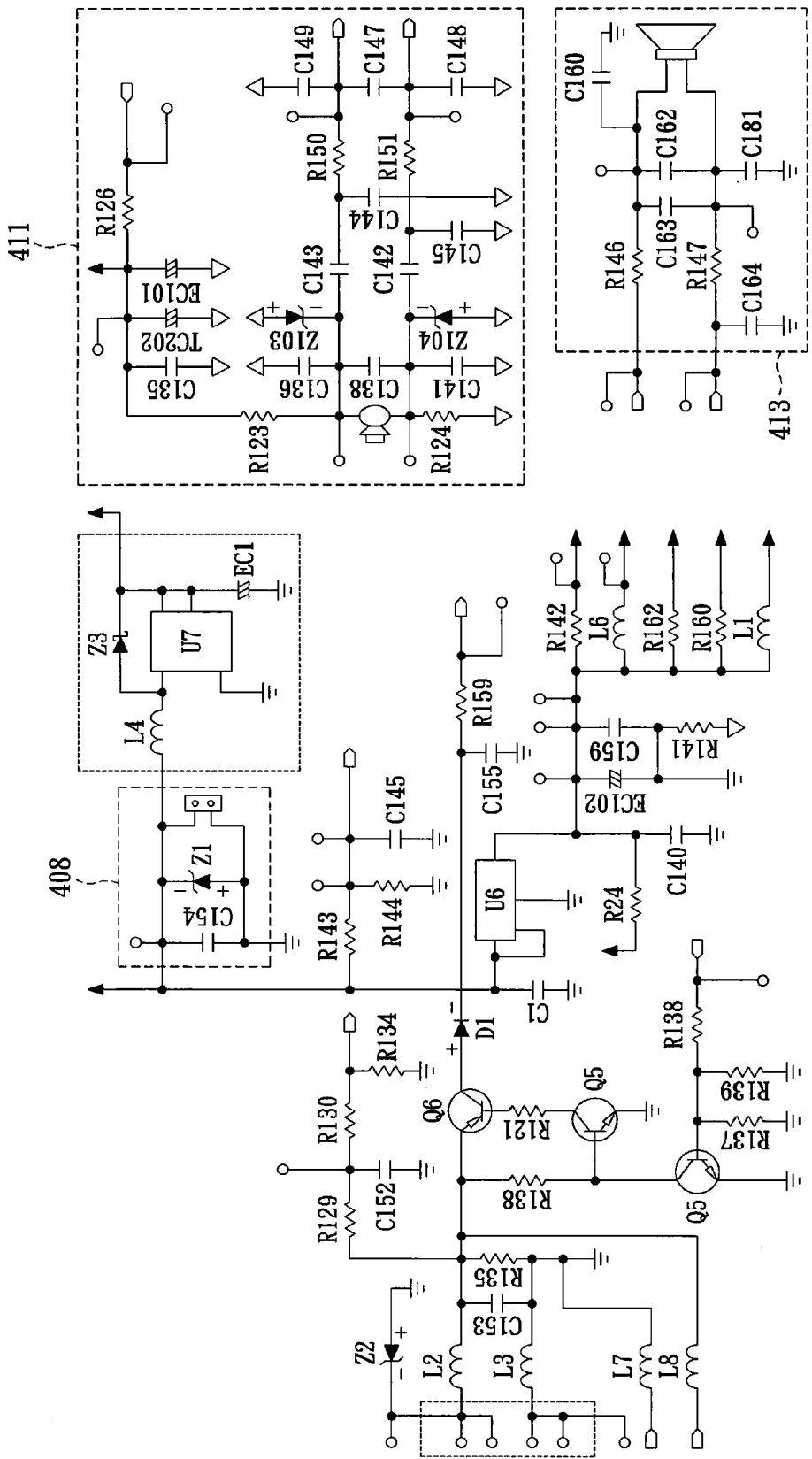
Figure 7D:
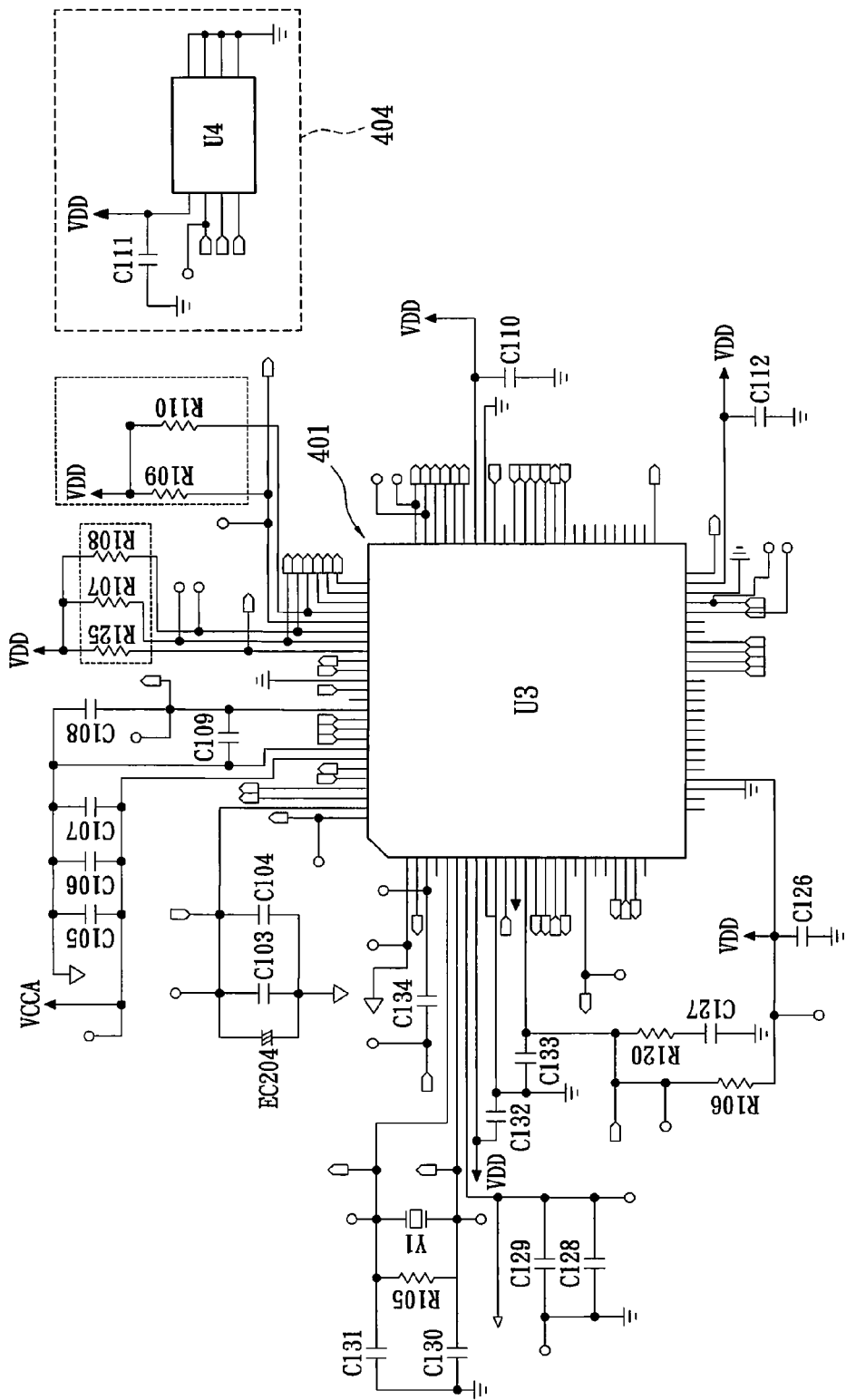
Figure 7E:
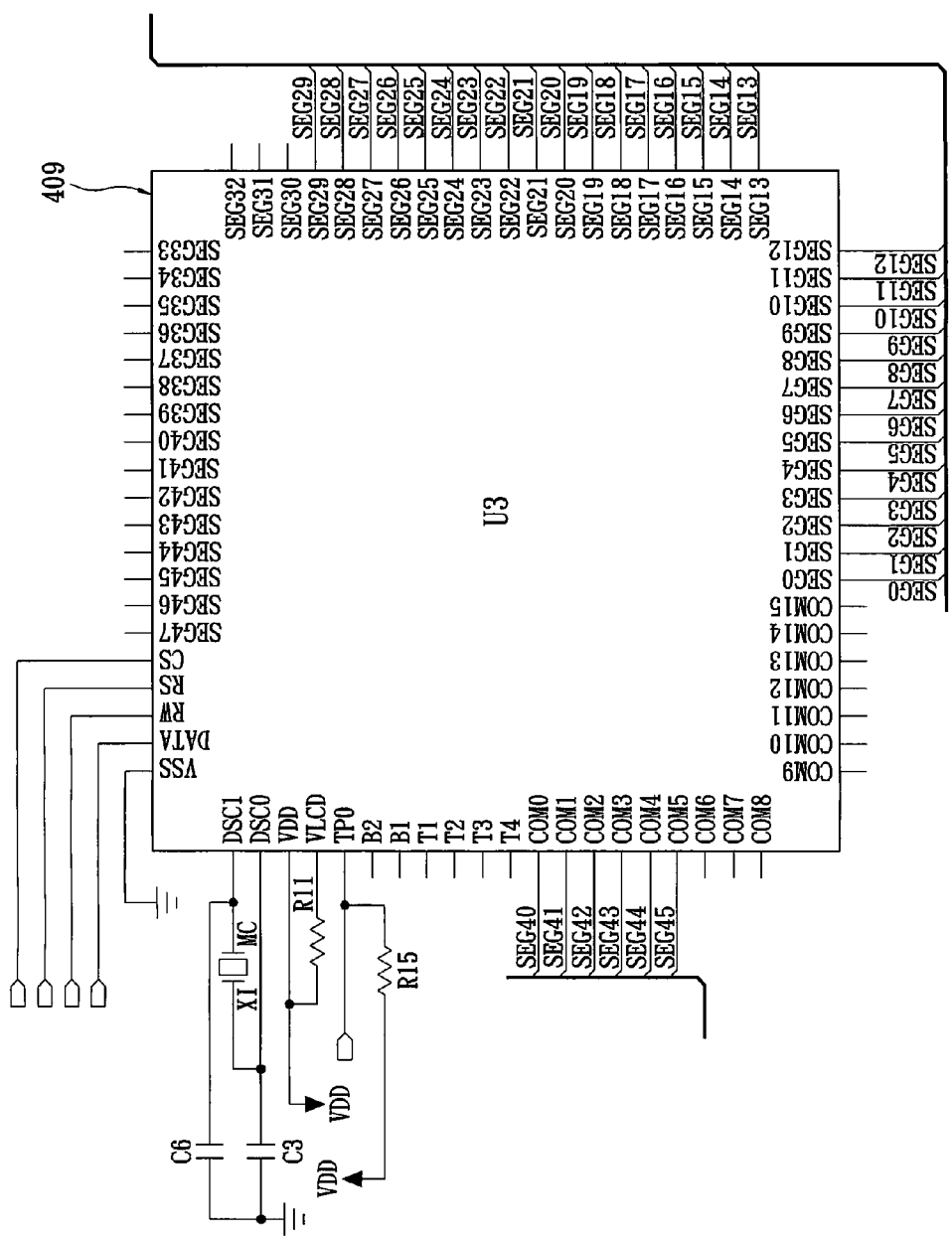

Refer to the FIG. 5 in conjunction with the FIG. 3A or FIG. 3B, in which a block diagram of the second control unit according to the DECT earphone is shown. Reference are made to the FIG. 7A to 7E, these are circuitry diagrams of the DECT earphone in accordance with certain aspects of the present technique. The second control unit of the DECT earphone 4 in accordance with the present invention comprises a second central control unit 401, a second DECT wireless unit 405 and a battery 408, wherein all of them are coupled with the second central control unit 401. The second central control unit 401 communicates remotely with the DECT host 3 through the second DECT wireless unit 405. The battery 408 is coupled with the second central control unit 401 and the second DECT wireless unit 405 and configured to provide the operating power required for the second central control unit 401 and the second DECT wireless unit 405 in function.

Reference is made to the FIG. 5 again. The second control circuit further comprises a button unit 410, a second display 409, a second flash memory unit 404, a second loudspeaker 413 and a second microphone 411, wherein all of them are coupled with the second central control unit 401. The button unit 410 is configured to provide a telephone number and various functional commands to the second central control unit 401 for indicating the second central control unit 401 to execute the corresponding operations. For example, the operation of dialing, the selection of voice transmission path and the selection of communication network. The second display 409 is configured to display the information of a battery capacity, a dialing number, a contact phone book, and a charge state of the battery. The second flash memory unit 404 is configured to store a program of the DECT earphone 4 executed by the second central control unit 401 for controlling the abovementioned units 405, 409, 410, 411 and 413. The second loudspeaker 413 and the second microphone 411 are configured to broadcast and receive the audio of the mutual-communicating, respectively.

Reference is made to the FIGS. 3A, 3B, 4 and 5 again. The application of the DECT wireless hands-free communication apparatus of the present invention is described as following. When there is an incoming call, the user can mutually communicate with another user via the first loudspeaker 314 and the first microphone 313. Besides, the user can take out the DECT earphone 4 from the DECT host 3 and communicate in hands-free way alternately while moving around.

Reference is made to the FIGS. 3A, 3B, 4 and 5 again. The user can answer the incoming call by operating the answer button (not shown) of the DECT host 3 to command the first central control unit 301 to receive the incoming call signal S1 by driving the electronic switch unit 302 to be conductive. Then the user can communicate mutually with a plurality of users based on broadcasting and receiving audio functions provided by the electronic switch unit 302, the first central control unit 301, the communication network unit 304, the first microphone 313 and the first loudspeaker 314 of the DECT host 3.

Reference is made to the FIGS. 3A, 3B, 4 and 5 again. The user can answer the incoming call in private by taking out the DECT earphone 4 from the DECT host 3 and applying it in hands-free way to communicate mutually with the others wirelessly. When the DECT earphone 4 is separated from the DECT host 3, the judgment circuit 307 outputs the judgment signal S2 to the first central control unit 301. The first central control unit 301 receives the incoming call signal S1 by driving the electronic switch unit 302 to be in conduction. Then the user can communicate mutually with a plurality of remote users in private via the DECT earphone 4 associated with the operations of the electronic switch unit 302, the first central control unit 301, the communication network unit 304, the first DECT wireless unit 309 and the DECT earphone 4 of the DECT host 3.

Otherwise, if the DECT earphone 4 has already departed from the DECT host 3 when there is an incoming call. The user can answer the incoming call by using the button unit 410 on the DECT earphone 4 to control the first central control unit 301 via the DECT wireless communication technique. The first central control unit 301 receives the incoming call signal S1 by driving the electronic switch unit 302 to be in conduction. Then the user can communicate mutually with a plurality of remote users in private via the DECT earphone 4 associated with the operations of the electronic switch unit 302, the first central control unit 301, the communication network unit 304, the first DECT wireless unit 309 and the DECT earphone 4 of the DECT host 3.

To sum up, the DECT wireless hands-free communication apparatus of the present invention is linked with the PSTN for dialing a local call. The present invention can achieve the goal of mutual-communicating in hands-free way via hands-free transmitter. It allows users to choose the appropriate communication methods so as to prevent the arms from aching when users make or receive a call too long. Meanwhile, the present invention makes the improvements on the tone quality of the communication in life or at work when users communicate mutually with a plurality of remote users by providing the functions of broadcasting and receiving the audio.

The above-mentioned descriptions represent merely the preferred embodiment of the present invention, without any intention to limit the scope of the present invention thereto. Various equivalent changes, alternations or modifications based on the claims of present invention are all consequently viewed as being embraced by the scope of the present invention.

What is claimed is:

1. A DECT wireless hands-free communication apparatus, comprising:
   a DECT host, which is coupled with a PSTN and equipped with an earphone receiving recess, wherein the earphone receiving recess having a magnetic device is mounted on the DECT host; and
   a DECT earphone, comprising a button unit adapted to provide a telephone number and various functional commands to the second central control unit;
   wherein the DECT earphone associated with a magnetic conductive device and wirelessly communicates with the DECT host via the digital enhanced cordless telecommunication technique, is capable of being received within the earphone receiving recess while the magnetic conductive device is close enough to the earphone receiving recess so as to be magnetically attracted to the magnetic device of the earphone receiving recess
   wherein when the DECT earphone is no longer received within the earphone receiving recess of the DECT host an incoming call signal is directed to the DECT earphone; otherwise, the incoming signal is received by the DECT host.

2. The DECT wireless hands-free communication apparatus according to claim 1, wherein the DECT host further includes a lock machine which is provided for locking the DECT earphone in the earphone receiving recess.

3. The DECT wireless hands-free communication apparatus according to claim 2, wherein the DECT host further comprises:
   a telephone ringing unit, which is configured to receive the incoming call signal from the PSTN and generates a warning ringing according to the incoming call signal, which is received when the DECT earphone is received within the earphone receiving recess;
   an electronic switch unit, which is coupled with the PSTN;
   a first central control unit, which is configured to receive the incoming call signal via the telephone ringing unit and control the electronic switch unit to be turned on according to the incoming call signal;
   a communication networking unit, coupled with the first central control unit, is configured to receive the incoming call signal via the electronic switch unit in conduction state; and a first DECT wireless unit, which is coupled with the first central control unit.

4. The DECT wireless hands-free communication apparatus according to claim 3, wherein the DECT host further comprises a judgment circuit, which is coupled with the first central control unit and configured to output a judgment signal to the first central control unit according to whether the DECT earphone is received in the earphone receiving recess.

5. The DECT wireless hands-free communication apparatus according to claim 4, wherein the DECT host further comprises:
   a first display, which is coupled with the first central control unit;
   a first flash memory unit, which is coupled with the first central control unit;
   a first loudspeaker, which is coupled with the first central control unit; and
   a first microphone, which is coupled with the first central control unit.

6. The DECT wireless hands-free communication apparatus according to claim 5, wherein the DECT host further comprises:
   a voltage stabilizing unit, coupled with the first central control unit and the first DECT wireless unit, is configured to receive a DC power and output a supply voltage to the first central control unit and the first DECT wireless unit;
   a charging circuit unit, which is coupled with the central control unit and configured to receive the DC power and output a charging voltage to the DECT earphone while the DECT earphone is attached on the earphone receiving recess; and
   a charge indicating unit, which is coupled with the first central control unit.

7. The DECT wireless hands-free communication apparatus according to claim 6, wherein the DECT host further comprises:
   a shock protection unit, which is coupled with the PSTN and configured to protect the incoming call signal; and
   a bridge rectification unit, which is coupled with the shock protection unit and the telephone ringing unit in between and configured to rectify the incoming call signal.

8. The DECT wireless hands-free communication apparatus according to claim 1, wherein the DECT earphone further comprises:
   a second central control unit;
   a second DECT wireless unit, which is coupled with the second central control unit; and
   a battery, which is coupled with the central control unit and the second DECT wireless unit.

9. The DECT wireless hands-free communication apparatus according to claim 1, wherein the DECT earphone further comprises:
   a second display, which is coupled with the second central control unit.

10. The DECT wireless hands-free communication apparatus according to claim 1, wherein the DECT earphone further comprises:
    a second flash memory unit, which is coupled with the central control unit;
    a second loudspeaker, which is coupled with the second central control unit; and
    a second microphone, which is coupled with the second central control unit.

* * * * *